J. FRASER.
LAVATORY FITTING.
APPLICATION FILED APR. 27, 1918.
1,281,335.
Patented Oct. 15, 1918.
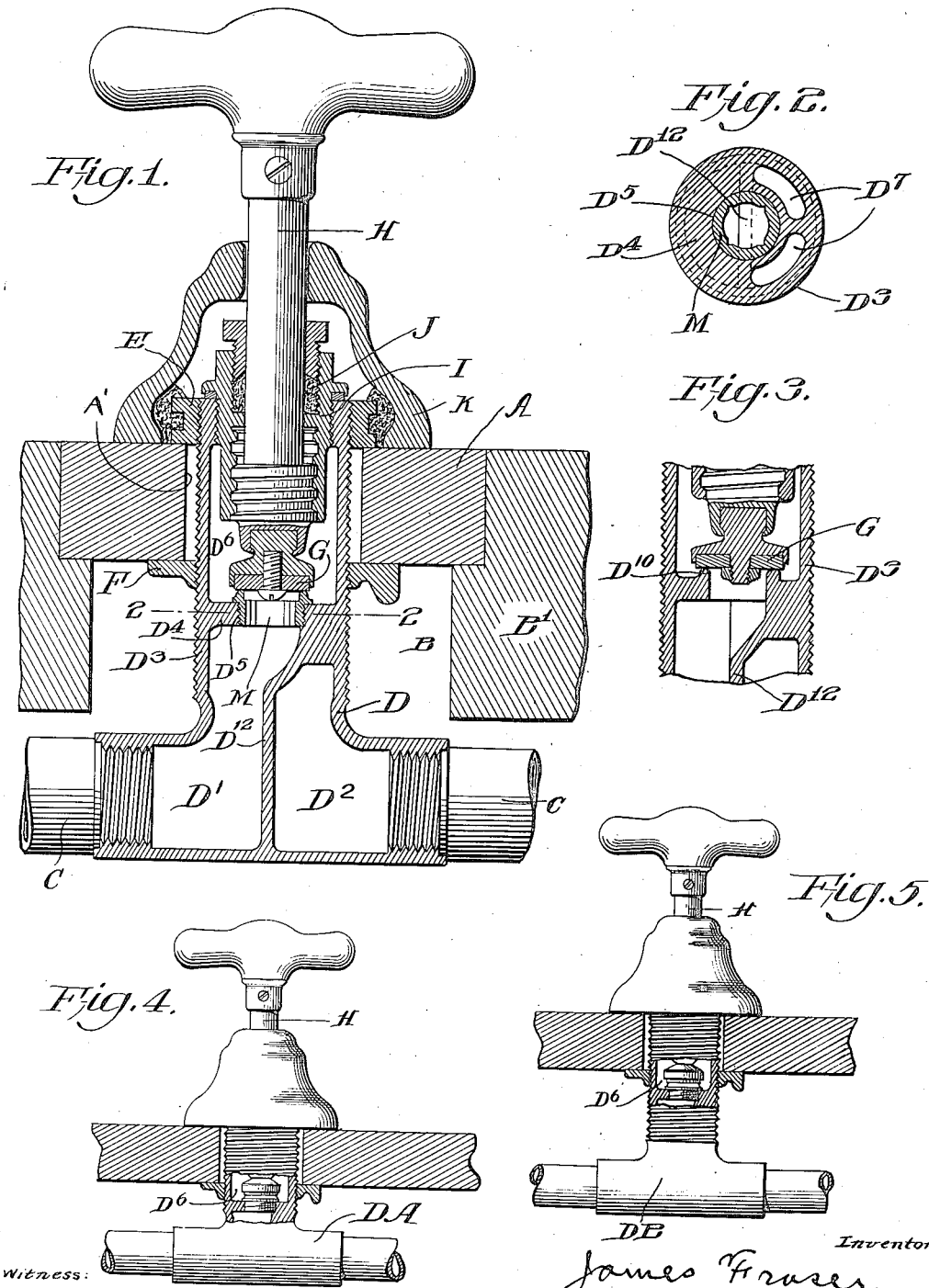

UNITED STATES PATENT OFFICE.

JAMES FRASER, OF WILMINGTON, DELAWARE, ASSIGNOR TO SPEAKMAN SUPPLY AND PIPE CO., OF WILMINGTON, DELAWARE, A CORPORATION OF DELAWARE.

LAVATORY-FITTING.

1,281,335.

Specification of Letters Patent.

Patented Oct. 15, 1918.

Application filed April 27, 1918. Serial No. 231,122.

*To all whom it may concern:*

Be it known that I, JAMES FRASER, a citizen of the United States of America, residing in Wilmington, in the county of New Castle, in the State of Delaware, have invented certain new and useful Improvements in Lavatory-Fittings, of which the following is a true and exact description, reference being had to the accompanying drawings, which form a part thereof.

My present invention is an improvement in valves especially devised for use as a lavatory fitting, and particularly for use where a portion of the valve projects through a wall or slab with the handle of the valve at one side of the wall and with the valve body located in a recess in or at the opposite side of the wall or slab from that at which the handle is located.

The general object of the invention is to provide a valve for the particular purpose specified, characterized by a disposition of the valve seat facilitating regrinding of the valve seat, or the renewal of the valve seat member in case the valve body is provided with a removable valve seat member, without requiring the disconnection of the valve body from the piping of which it normally forms a part.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of my invention.

Of the drawings:

Figure 1 is a sectional elevation.

Fig. 2 is a section on the line 2—2 of Fig. 1.

Fig. 3 is a sectional elevation of a portion of a valve having a valve seat different from that of the valve shown in Figs. 1 and 2.

Figs. 4 and 5 are views, partly in section, of valves differing from one another only in their relative proportions.

In the construction shown in Fig. 1, A represents a plate received in an aperture B, formed in the wall B' of a bath room or like chamber. The plate A is formed with an aperture A' through which projects a portion of a valve casing D. The latter is formed with inlet and outlet chambers D' and $D^2$, separated by a partition $D^{12}$, and is formed with threaded openings into these chambers into which are secured the ends of pipe sections C connected by the valve casing. The valve casing D is formed with a lateral tubular portion $D^3$, extending at right angles to the pipe sections C and forming the portion of the valve casing which projects through the cover plate A. The tubular projection $D^3$ is externally threaded and is normally anchored to the plate A by nuts E and F, screwed on the projection $D^3$ and bearing against the inner and outer faces of the plate A.

A diaphragm or partition portion $D^4$ extends across the tubular portion $D^3$ at a suitable distance from the free end of the latter. A central passageway $D^5$ connects the valve chamber D' with the chamber $D^6$ in the tubular portion $D^3$ at the outer side of $D^4$, and ports $D^7$ lead from the chamber $D^6$ through the portion $D^4$ to the valve chamber $D^2$. The partition $D^{12}$ merges into the transverse partition $D^4$. The flow through the passageway or port $D^5$ is controlled by a valve member G carried at the inner end of a threaded valve spindle H, which works in a nut I secured in and closing the outer end of the tubular portion $D^3$. At its outer end the nut is provided with a stuffing box J for the valve spindle. A shield or bonnet K fits against the outer wall of the plate A and forms a more or less ornamental cover for the nut E, the outer end of the tubular portion $D^3$ and nut I. This bonnet is secured to the nut E as by cement L. In the particular construction shown in Figs. 1, 2, 4 and 5 the passage $D^5$ is threaded to receive a removable annular valve seat member M, against which the valve G bears to close communication between the chambers D' and $D^6$. The valve seat proper may, however, be in the form of a lip or surface $D^{10}$ formed integrally on the diaphragm or partition $D^4$, as shown in Fig. 3.

With the construction described, the valve may readily be so proportional as to bring the valve seat into convenient position for inspection, renewal or regrinding without requiring the valve body to be disconnected from the piping, of which it normally forms a part. The type of valve construction described makes it possible to maintain a fixed distance between the valve seat and the outer end of the tubular portion D³ in valves in which the length of this tubular portion differs as it does in the valves shown in Figs. 4 and 5. This makes it possible to employ valve spindles, clamping nuts, etc., each of a single standard size, with valve bodies in which the tubular extension parts D³ are made of different lengths to accommodate different wall thickness or plumbing layouts differing otherwise. The fixed distance between the valve seat and the outer end of the tubular part in which it is located not only facilitates inspection, renewals and repairs after the valves are installed, but simplifies and cheapens the cost of manufacture of a line of valve bodies in which the latter tubular portions are of different lengths.

Having now described my invention, what I claim as new and desire to secure by Letters Patent, is:

1. A valve body formed with inlet and outlet chambers and with a tubular extension formed internally with a transverse partition between its ends and with a longitudinal partition extending inwardly from said transverse partition and separating said inlet and outlet chambers, said transverse partition being formed with a central port communicating at its inner side with one of said chambers, and being formed with one or more other ports, each communicating at its inner end with the second of said chambers, a closure for the outer end of said tubular projection, a valve controlling said central port, provided with a spindle portion projecting through said closure, and clamping means engaging said tubular portion and adapted to clamp the valve body against a plate or apertured support, through which said tubular projection may extend.

2. A valve body formed with inlet and outlet chambers and with an externally threaded tubular extension, formed internally with a transverse partition between its ends, and with a longitudinal partition extending inwardly from said transverse partition and separating said inlet and outlet chambers, said transverse partition being formed with a central port communicating at its inner side with one of said chambers, and being formed with one or more other ports, each communicating at its inner end with the other of said chambers, a closure for the outer end of said tubular projection, a valve controlling said central port, provided with a spindle portion projecting through said closure, and clamping means threaded on said tubular portion and adapted to clamp the valve body against a plate or apertured support, through which said tubular projection may extend.

JAMES FRASER.